United States Patent [19]
Niwa

[11] Patent Number: 5,248,924
[45] Date of Patent: Sep. 28, 1993

[54] NUMERICALLY CONTROLLED MACHINE TOOL MANAGEMENT SYSTEM

[75] Inventor: Tomomitsu Niwa, Aichi, Japan

[73] Assignee: Mitsubishi Denki K.K., Tokyo, Japan

[21] Appl. No.: 680,180

[22] Filed: Apr. 3, 1991

[30] Foreign Application Priority Data

Apr. 5, 1990 [JP] Japan .................................. 2-90980
Mar. 28, 1991 [JP] Japan .................................. 3-64939

[51] Int. Cl.⁵ ...................... G06F 15/00; G01R 11/57
[52] U.S. Cl. .................................... 318/569; 318/571; 318/570; 364/481; 364/483; 364/474.02
[58] Field of Search ................ 318/560–636; 340/706, 711, 709, 707; 364/468, 478, 474.01–474.29, 483, 481; 395/425; 235/385, 375, 432

[56] References Cited

U.S. PATENT DOCUMENTS

| | | | |
|---|---|---|---|
| 4,060,848 | 11/1977 | Hyatt | 364/200 |
| 4,118,871 | 10/1978 | Kirkham | |
| 4,228,495 | 10/1980 | Bernhard et al. | 364/474 |
| 4,291,375 | 9/1981 | Wolf | 364/483 |
| 4,511,979 | 4/1985 | Amirante | 364/481 |
| 4,536,646 | 8/1985 | Adams et al. | |
| 4,816,654 | 3/1989 | Anderl et al. | |
| 4,878,176 | 10/1989 | Teranishi et al. | |
| 4,956,765 | 9/1990 | Iwagaya | 364/192 |
| 4,964,065 | 10/1990 | Hicks et al. | 364/514 |
| 5,046,014 | 9/1991 | Anjo | 364/474.02 |

FOREIGN PATENT DOCUMENTS

0107291 8/1983 European Pat. Off.
0236506 9/1986 European Pat. Off.
0227113 12/1986 European Pat. Off.

OTHER PUBLICATIONS

Patent Abstracts of Japan, vol. 13, No. 217 (M828), May 22, 1989, and JP-A-1-034-776 (Tokyo Electric Co. Ltd.), Feb. 1989, Abstract.

*Primary Examiner*—Paul Ip
*Attorney, Agent, or Firm*—Sughrue, Mion, Zinn, Macpeak & Seas

[57] ABSTRACT

A numerical control system for controlling a machine tool including a control device for controlling the machine tool; external portable storage device for storing data; a disabling device for disabling device for disabling the control device; a read/write device, operable when the external portable storage device is manually coupled thereto, for reading data from the external portable storage device and for writing data to the external portable storage device; and a determining device for determining whether the external portable storage device is coupled to the read/write device. The disabling device disables the control device when the determining device determines that the external portable storage devices not coupled to the read/write device.

21 Claims, 18 Drawing Sheets

```
OPERATOR    : MITSUBISHI MIKI
WORK START  : 1990.08.07  08:11

TIME
       CODE  OF DAY    DETAILS 11    8:15    W120 INPUT
        12    8:17    P001 INPUT
        13    8:20    T001 INPUT
        01    8:31    W120,500 STARTED
        02   11:54    W120,500 COMPLETE
             10:00    WORK STOPPED
             10:17    WORK RESUMED
        11   13:26    W700 INPUT
        01   13:47    W700,200 STARTED
       #27   14:13    TOOl II BROKEN (47 PCS. CUT)
       #33   14:34    T001 CHANGED
        07   14:47    CUTTING RESUMED
        02   16:17    W700,200 COMPLETE

WORK END    16:41

OPERATOR    : MITSUBISHI YUUKO
WORK START  : 1990.08.08   8:15
```

```
* DISP ALL
* CLEAR
          6,23 SAY " * * * TOOL LAYOUT * * * "
          8,23 SAY "POCKET NO.  TOOL NO.       APPLICATION"
         10,27 SAY "1            7            OD ROUGHING"
         11,27 SAY "2           11            OD FINISHING"
         12,27 SAY "3            3            ID ROUGHING"
         13,27 SAY "4           16            ID FINISHING"
         14,27 SAY "5            8            DRILLING"
         15,27 SAY "6            5            GROOVE ROUGHING"
         16,27 SAY "7           19            GROOVE FINISHING"
         17,27 SAY "8            2            THREADING"
         20,20 SAY "SET TOOLS AS INDICATED ABOVE AND PRESS 'CHECK' KEY."
* CHECK
* CLEAR
          6,27 SAY " * * * DRAWING NO. TWO103A * * * "
* LOAD W120
          9,12 SAY " CUTTING PROGRAM  W120 INPUT"
* LOAD P001,90.08.03
         11,12 SAY " PARAMETER  P001 INPUT"
* LOAD T001,90.08.11
         13,12 SAY " TOOL INFORMATION  T001 INPUT"
         16,10 SAY " 1500 PCS. OF WORKPIECE NO. 120 WILL BE CUT"
         18,10 SAY " IDLE PROGRAM OF WORKPIECE NO. 120 AND CHECK RUN"
         20,10 SAY " AFTER CHECKING PROPER RUN, PRESS 'CHECK' KEY."
* CHECK
* DO W120,1500
```

**\*\*\* TOOL LAYOUT \*\*\***

| POCKET NO. | TOOL NO. | APPLICATION |
|---|---|---|
| 1 | 7 | OD ROUGHING |
| 2 | 11 | OD FINISHING |
| 3 | 3 | ID-ROUGHING |
| 4 | 16 | ID-FINISHING |
| 5 | 8 | DRILLING |
| 6 | 5 | GROOVE ROUGHING |
| 7 | 19 | GROOVE FINISHING |
| 8 | 2 | THREADING |

SET TOOLS AS INDICATED ABOVE AND PRESS "CHECK" KEY

| WORK DIRECTIVE | FREE OPERATION | | FOLLOWING SCREEN | PRECEDING SCREEN | CHECK |
|---|---|---|---|---|---|

PRINT

DRAWING NO. TW0103A

CUTTING PROGRAM   W120 INPUT
PARAMETER         P001 INPUT
TOOL INFORMATION  T001 INPUT

1500 PCS. OF WORKPIECE NO.120 HAVE BEEN CUT.
2000 PCS. IN DRAWING NO. TW0107C WILL BE CUT.
AFTER REMOVING FINISHED WORKPIECES, PRESS "CHECK" KEY.

| WORK DIRECTIVE | FREE OPERATION | | FOLLOWING SCREEN | PRECEDING SCREEN | CHECK |
|---|---|---|---|---|---|

PRINT

FIG. 18
```
OPERATOR    : 1990.08.07  08:11
WORK END                  16:41
        TIME
 CODE   OF DAY    DETAILS
  11    8:15    W120 INPUT
  12    8:17    P001 INPUT
  13    8:20    T001 INPUT
  01    8:31    W120,500 STARTED
  02   11:54    W120,500 COMPLETE
  05   12:03    WORK STOPPED
  06   13:17    WORK RESUMED
  11   13:26    W700 INPUT
  01   13:47    W700,200 STARTED
 #27   14:13    T001 11 BROKEN (47 PCS. CUT)
 #33   14:34    T001 CHANGED
  07   14:47    CUTTING RESUMED
  02   16:17    W700,200 COMPLETE
```
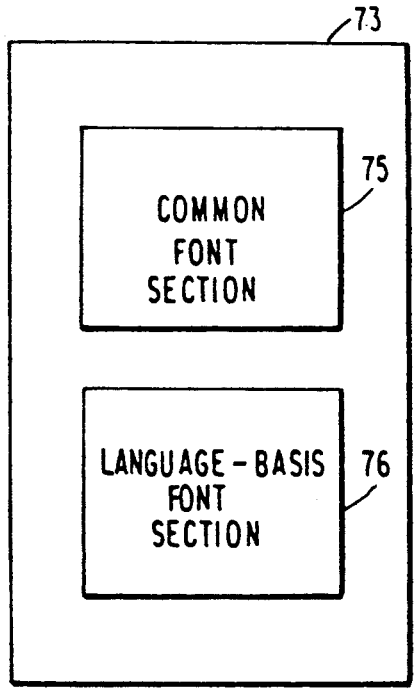
FIG. 19
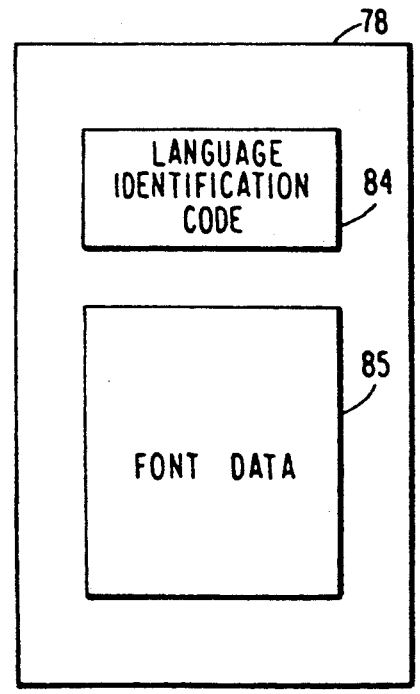
FIG. 20

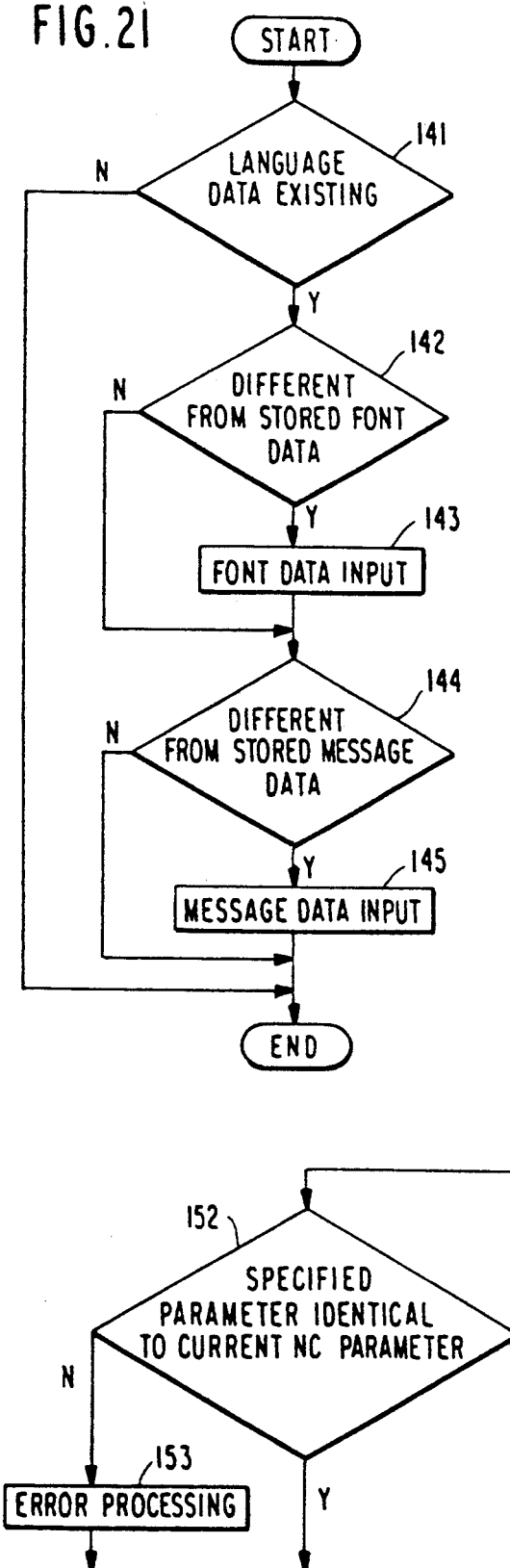
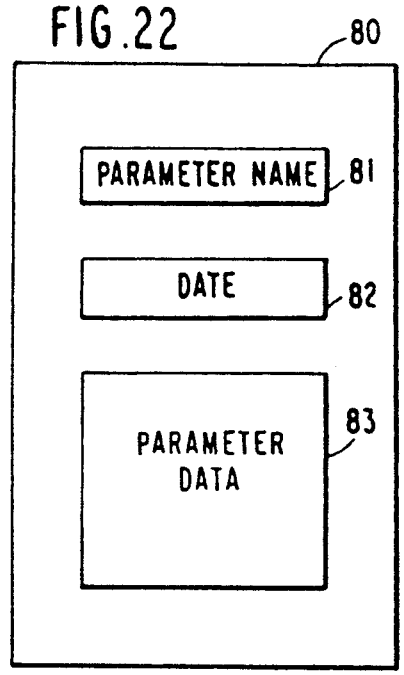
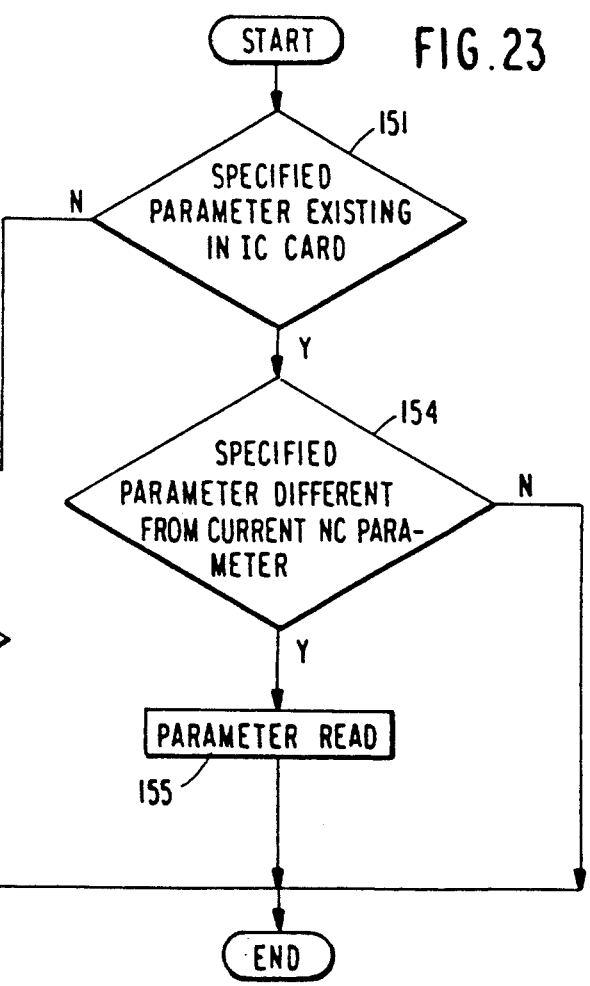

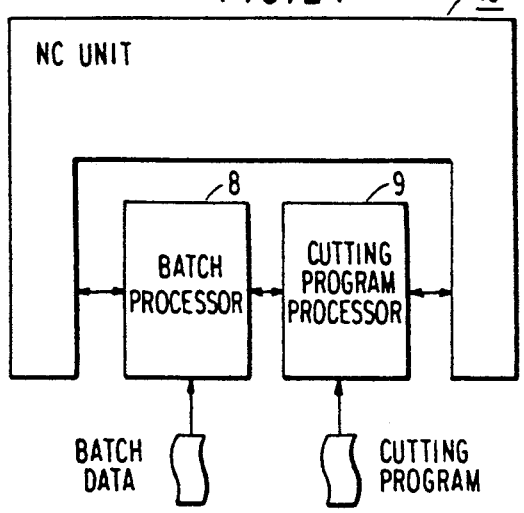
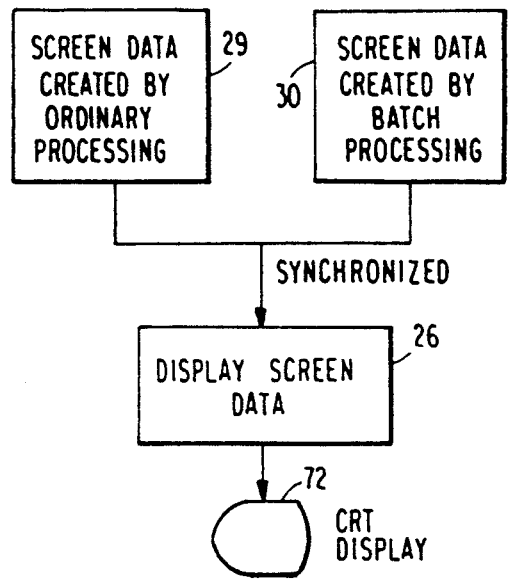
```
*DISP 16,50-20,80
*CLEAR
    16,50  SAY "DRAWING NO. WT0103A"
    17,52  SAY "WORKPIECE NO. 120"
    18,54  SAY NUMER OF WORKPIECES CUT
    19,54  SAY "TOTAL NUMBER OF WORKPIECES CUT:1500"
    :
*WC=0
*DOWHILE WC<1500
    *DO W120
    *WC=WC+1
    18,66 DISPN(WC,4,0)
*ENDDO
```
FIG.25
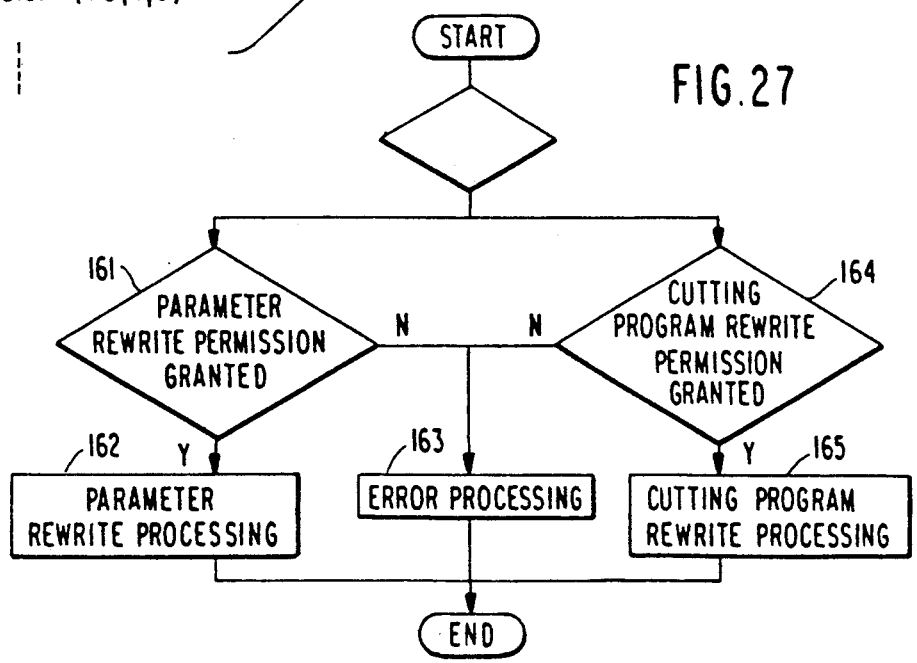

NUMERICALLY CONTROLLED MACHINE TOOL MANAGEMENT SYSTEM

BACKGROUND OF THE INVENTION

The present invention relates generally to a numerically controlled machine tool and to an operator work management system.

A numerical control unit is designed to perform numerical control processing in accordance with a cutting program provided by a paper tape, etc. Specifically, a machine tool is driven according to the results of the control processing in order to cut a workpiece.

FIG. 10 is a block diagram of a prior art numerical control unit. A cutting program read from a tape reader 11 is stored into a memory 18. When this cutting program is to be executed, it is first read from the memory 18 block by block and then processed in a controller 12 containing a processor, a control program memory, etc. The controller 12 then performs numerical control processing in accordance with the cutting program, thereby driving a servo motor of a machine tool 14 so as to move a table or a tool rest in accordance with a move command, or for controlling the machine tool 14, via an electrical control box 13, to perform, for example, coolant on/off and spindle run/reverse/stop commands. The numeral 15 indicates an operation board including zeroing, jogging and other command switches, buttons and indicators. The numeral 16 is a manual data input device (hereinafter referred to as the "MDI") for manually entering various types of data into the controller 12, and numeral 17 is a display unit ("DSP") for displaying the current position and other data of the machine. The components 11 to 17 (with the exception of the machine tool 14) constitute a computerized numerical control unit (hereinafter referred to as a "CNC"). The controller 12 in the CNC is a computer which performs predetermined numerical control processing on the basis of a control program and the cutting program to control the machine tool 14.

The machine tool 14 controlled by the CNC is referred to as a numerically controlled machine tool (NC machine tool), and most of the present machine tools are NC machine tools. The operator controlling this NC machine tool is usually provided with work directives through cutting programs for cutting workpieces to be finished on that day, and work setup instructions as a preliminary to cutting. The operator carries out the setup work in accordance with the work instruction and causes the CNC to run the predetermined cutting programs to cut workpieces. The operator then writes the work done on that day in a work report or the like. The NC machine tool may generally be operated by any person including unauthorized personnel by simply powering up. To prevent this, some CNCs have a function of disabling NC data from being rewritten unless a key provided therefor is switched on.

Further, recent CNCs holding a larger internal memory capacity have a function of allowing the keying history of the operator to be stored in an internal memory for a later check of the operation performed. Further, some CNCs allow CNC-generated error, alarm and other histories to be stored in an internal memory, so that errors and alarms occurring at various times can be checked later.

Furthermore, there is a growing tendency for recent CNCs to display messages, etc. for the operator on a display device to allow the operator to "converse" with the CNC and be guided during operation, thereby improving the operability of the CNC. To allow kanji (Chinese characters), kana (Japanese phonetic characters) and other characters to be displayed for this purpose, in addition to the roman alphabet and numerals, the NC contains character fonts which are employed to display kanji, kana and other characters.

FIG. 12 is a block diagram illustrating the major parts of a prior art CNC display control section, wherein the numeral 60 indicates a microcomputer; 61 a ROM for storing programs and other data required for the microcomputer 60 to perform predetermined operations, 59 a RAM used for pointers, operation, etc., 62 an address decoder for accessing memories, etc., and 63 a first-in first-out register (FIFO register) to which display data is written from a host microcomputer for NC control (not illustrated) and which is designed to issue an interrupt signal INT to the microcomputer 60 when, for example, data of 16 characters is entered. The numeral 64 indicates a CRT controller for generating horizontal and vertical synchronization signals and scanning addresses, 65 a pulse generator circuit, 66 an address switching circuit for switching between a CPU address and a scanning address, 67 an address decoder, 68 a character RAM (video RAM) for storing characters coded into addresses corresponding to the positions on a display screen, 69 a color RAM (video RAM) for storing colors for painting characters on the display screen, 70 a character ROM for converting character codes output by the character RAM 68 into corresponding display data (alphabetic characters, kanji, kana and symbols), 71 a display control circuit for outputting red, green and blue video signals in accordance with the output of the color RAM 69, 17 a display unit, and 72 a screen thereof.

A character string to be displayed on the screen 72 of the display unit 17 is entered sequentially from the NC controlling microcomputer (not illustrated) to the FIFO register 63. A character in this character string is coded, for example, in sixteen bits. When a character code of sixteen characters is entered into the FIFO register 63, the microcomputer 60 is interrupted to perform interrupt processing. In other words, the character code is read from the FIFO register 63 and written to the separately specified address of the character RAM 68.

When color designating information is then entered into the FIFO register 63, that information is read and color information is written to the corresponding area of the color RAM 69. When the information is written to the RAMs 68 and 69, the address switching circuit 66 is switched to the scanning address position of the CRT controller 64 whereby the contents of the character RAM 68 and the color RAM 69 at the scanning addresses are read in synchronization with each other. The output of the character RAM 68 is provided in character code and converted into display character data in the character RAM 70. Namely, if that character code is a kanji code, multiple pieces of dot data matching the shape of that kanji character are outputted. According to that dot data and the color information of the color RAM 69, the display control circuit 71 creates red, green and blue video signals, which are then input to the display unit 17 and displayed as a character on the screen 72. Accordingly, the use of the kanji and kana characters to form a character string sent from the NC controlling host microcomputer allows comments and other guides to be displayed in kanji and other characters which can be most easily understood by the Japanese. Since not many terms are employed in the NC field, the number of kanji characters used is limited. Hence, the character ROM can be composed of a single LSI for characters including kana.

Since the known display control device shown in FIG. 12 is configured as described above, the character ROM 70 must be replaced to display characters corresponding to the user's native language and the display language cannot be changed easily. To improve this disadvantage, a display control section wherein the character ROM 70 is replaced by a character RAM and the data of the character RAM is changed through the key switches of the operation panel for use with a numerical control unit is disclosed in Japanese Patent Disclosure Publication No. 189785 (1985).

In the NC machine tool known in the art which has only the aforementioned functions, a work instruction containing all work directives for the operator and a cutting program must be passed to the operator in pairs and both must always be managed at the same time. In addition, before starting the cutting operation, the operator needs to check various pieces of data (parameters, tool information, etc.) in the CNC to see if they are appropriate. Since all setup prior to the cutting is left to the operator, defects may occur due to operator errors, e.g. workpieces may be machined with a different parameter value.

In addition, because a work report is written by the operator, there may be incorrect or omitted entries, and further the operator may leave things out when inconvenient for himself or herself. Moreover, when it is desired to make the NC machine tool operable only for particular operators, the key of the CNC must be passed to each operator, and further, the absence of this key simply disallows the internal data of the CNC from being changed and the NC machine tool itself can be operated as desired.

SUMMARY OF THE INVENTION

A primary object of the present invention is to provide a CNC or other computer-controlled system which allows data such as work directives for the operator, cutting programs, parameters and tool information to be stored in a single portable storage medium, enabling the operator to display any necessary work directive on the CNC screen by simply inserting the storage medium into the CNC. All required data are read from the storage medium, set to the CNC, and printed on a printer as needed.

Another object of the present invention is to provide a CNC or other computer-controlled system which allows the work report of the operator to be eliminated by storing the work results of the operator in the storage medium. A reliable work record is kept by automatically recording the actual work of the operator in the storage medium.

A further object of the present invention is to provide a CNC or other computer-controlled system which provides a record of how long and in what way the NC machine tool has been operated by which operator to be kept in an operation recording memory in the CNC by placing operator identifying information in the storage medium.

A further object of the present invention is to provide a CNC which disallows an operator who attempts to operate an NC machine tool from doing so unless the operator loads the storage medium into the CNC and enters a PIN (personal identification number) code which matches that in the storage medium, and which ensures management of the NC machine tool by disallowing the NC machine tool from being operated if conditions such as the code number, availability periods and available time windows stored in the storage medium are not satisfied.

A further object of the present invention is to provide a display control section which allows data shown on a display device to be easily changed, including the language used in the display.

The CNC according to the present invention includes a read/write device (R/W device) to allow data in the portable storage medium to be transferred, and contains identification codes denoting NC machine tools, and the storage medium includes identification codes designating operators, PIN codes known only to the operators, and further has data including identification codes of the NC machine tools allowed for operation if there are several NC machine tools. The CNC is designed to perform processing after determining whether or not the operator is permitted to operate the CNC. The CNC always checks to see if the storage medium has been inserted in the CNC. Further, the CNC has clock and calendar functions, and the storage medium includes check data including the operable periods and operable time windows in which the operator is permitted to operate.

The display control section of the CNC comprises a font RAM for storing font data used for converting a predetermined character code into display data matching a display section and rewriting means for rewriting the font data placed in the font RAM. The rewriting means comprises an external storage medium for storing the font data and identification codes, and font data storing means for referencing the identification codes stored in the external storage medium for placing into the font RAM the font data stored in the external storage medium only when the external storage medium loaded stores the desired font data.

The display control section concerned with the present invention comprises a message RAM for storing message data employed for displaying a predetermined message on a display section and rewriting means for rewriting the message data placed in said message RAM. The rewriting means comprises an external storage medium storing the message data and identification codes employed for identifying the types of message data, and message data storing means for referencing the identification codes stored in the external storage medium for placing into the message RAM the message data stored in the external storage medium only when the loaded external storage medium stores the desired message data.

The CNC concerned with the present invention allows a dedicated language to be interpreted and batch-processed and work directive data to be described in the batch-processed dedicated language.

The CNC allows screen display commands described in the work directive data to be displayed on the CNC screen. The CNC allows the operator to switch between an ordinary CNC display screen and a work directive screen as appropriate. The CNC allows the work directive displayed on the CNC screen to be printed on a printer. The CNC also allows batch processing currently being performed to be stopped and resumed by operator commands. The CNC allows data, such as parameters and tool data, to be named as appropriate. The CNC allows date and time of creation to be assigned to data such as parameters and tool data.

The CNC allows a dedicated language for batch processing in a cutting program to be separated from the cutting program and processed in individual processing systems, and allows work records to be stored into the work record data area of the portable storage medium. The CNC also allows the record of operation performed to be stored in an operation recording memory provided in the CNC.

When attempting to operate the NC machine tool, the operator first loads the portable storage medium into the R/W device of the CNC and switches on the CNC power supply. The CNC then directs the operator to enter the PIN code. In response to this directive, the operator enters the PIN code. The NC machine tool is enabled for operation only if the PIN code matches a code in the storage medium and other availability conditions are satisfied (whether or not the NC machine tool is available and is in an available period for this operator, for example.

If the operator is not permitted to perform specific operation but nevertheless attempts to perform such an operation, the NC machine tool is disabled.

Removal of the storage medium from the CNC disables the CNC. The CNC cannot be operated outside the authorized period and time block during when the operator is permitted to operate the CNC.

The rewriting means rewrites the font data of the font RAM or the message data of the message RAM in blocks. The rewriting means references the identification codes stored in the external storage medium and rewrites the font data of the font RAM or the message data of the message RAM in blocks only when the external storage medium contains the desired character data or message data.

The CNC performs batch processing according to the work directive data stored in the storage medium, thereby displaying the work directives for the operator on the CNC screen, entering data such as the cutting programs, parameters and tool information, and making the settings for the cutting programs. The operator can work according to the work directives displayed on the CNC screen.

The operator can switch between the ordinary CNC screen and the work directive screen as appropriate to view the necessary screen when required, and can output the work directive data displayed on the screen to the printer as required. In addition, the operator can stop and resume the batch processing as needed.

The parameters, tool data, etc. can be managed under arbitrary names. The date of creation can be assigned to the parameters, tool data, etc. so that the data can be separated from the date and time of creation. The cutting program and the language dedicated to batch processing can be described on an identical program. Further, the work record of each operator and the operation record of the CNC can be easily kept.

BRIEF DESCRIPTION OF THE DRAWINGS

FIG. 13 gives an example of a work directive screen display.

FIG. 14 provides an example of a work directive screen display.

FIG. 18 provides an example of work record data.

FIG. 19 shows the contents of a font RAM.

FIG. 20 illustrates a data map in a font data section.

FIG. 21 is a schematic flowchart for language input processing.

FIG. 22 illustrates a parameter data section.

FIG. 23 is a schematic flowchart for parameter input processing.

FIG. 24 is a block diagram showing major data processing parts of the NC unit.

FIG. 25 provides an example of the work directive data.

FIG. 26 is a block diagram illustrating primary display data processing parts.

FIG. 27 is a schematic flowchart for processing performed to disable part of the operation.

DESCRIPTION OF THE PREFERRED EMBODIMENT

Figure 1:
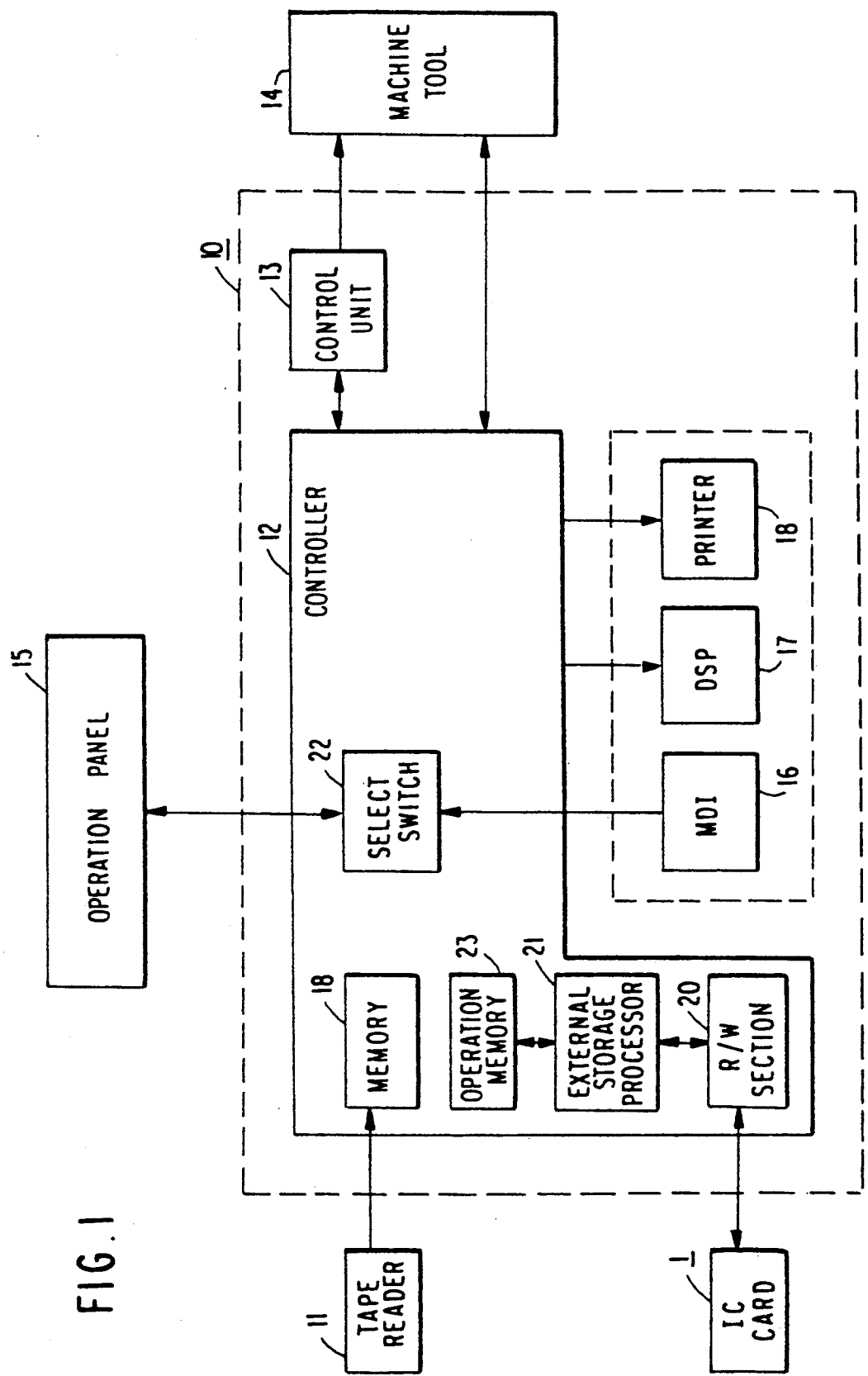
FIG. 1 is a block diagram illustrating major parts of an NC unit concerned with the present invention.

An embodiment of the present invention will now be described with reference to the drawings. FIG. 1 is a block diagram showing the CNC according to the present invention. As compared to the block diagram of the known CNC shown in FIG. 10, the major characteristics of the CNC according to the invention are the additions of a R/W section 20 for transferring data to and from the portable storage medium, an external storage medium processor 21 for controlling the data transfer to and from the storage medium and the main functions of the present invention, and a select switch 22 for switching the operation of the operation board 15 and the MDI 16 to be valid or invalid, and an operation recording memory 23.

Figure 11:
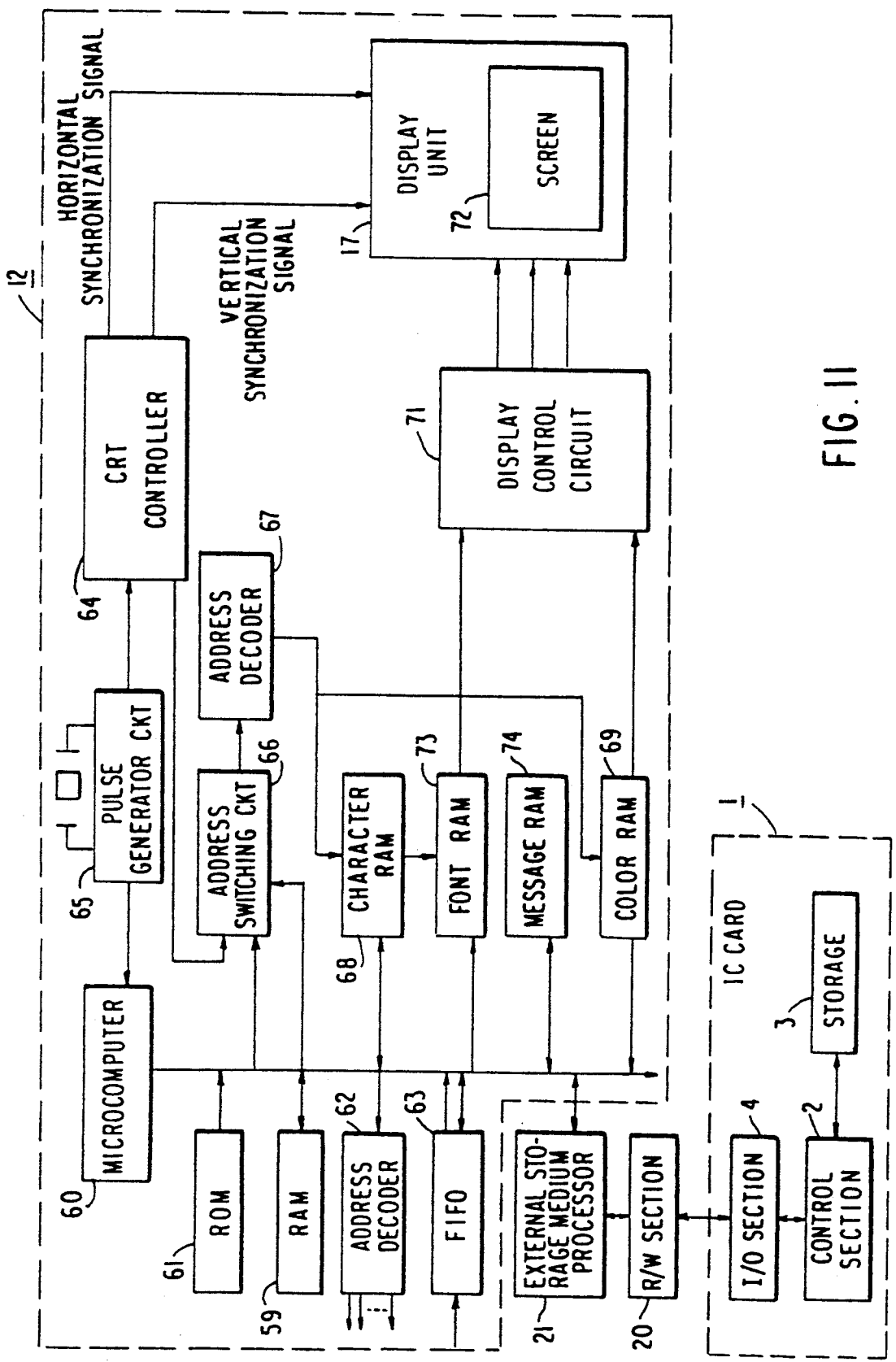
FIG. 11 is a block diagram showing main parts of a display control section concerned with the present invention.
Figure 12:
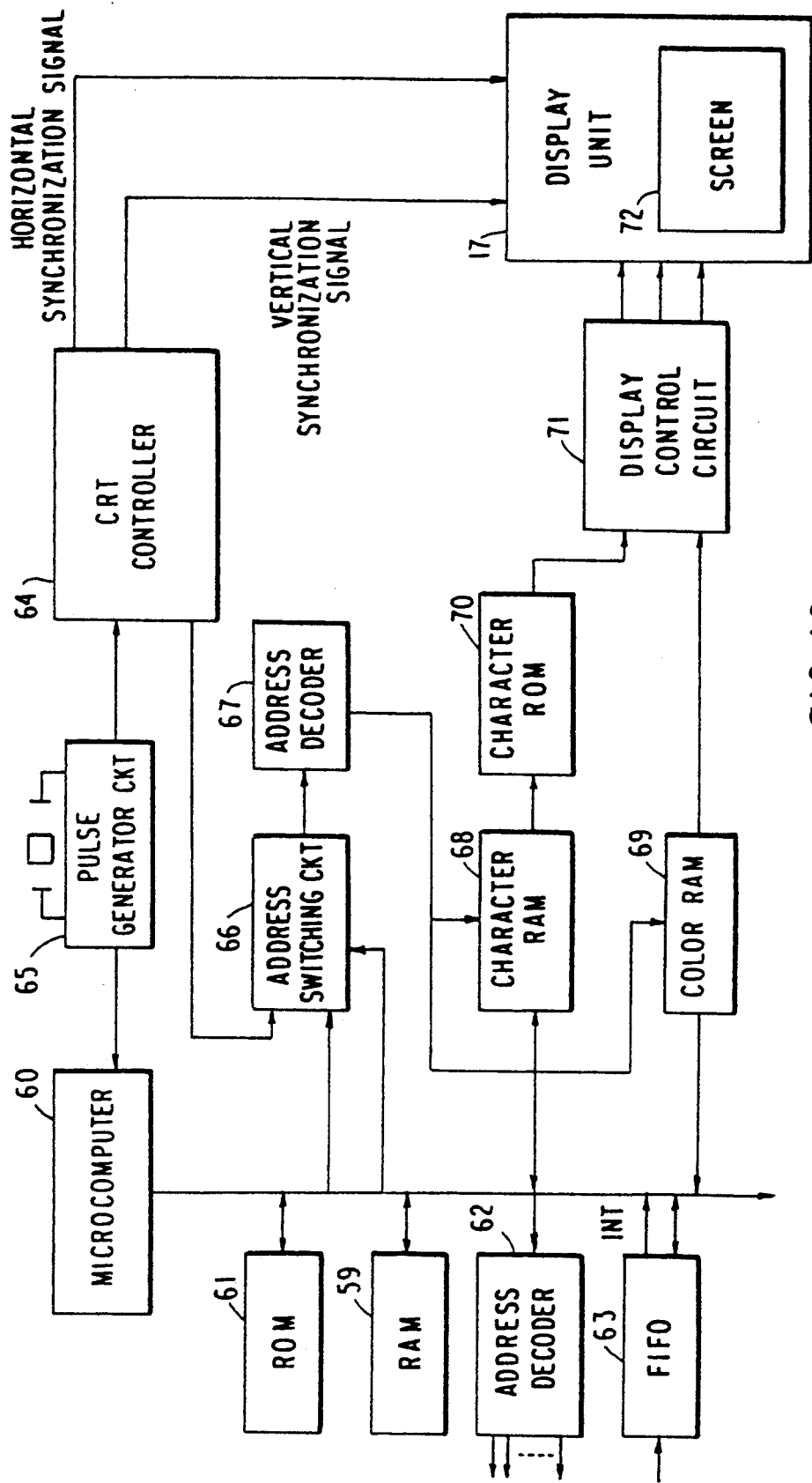
FIG. 12 is a block diagram illustrating main parts of a display control section known in the art.

Further, as compared to the block diagram the display control section in the prior art CNC in FIG. 12, the CNC according to the present invention is characterized by the use of RAMs in the font and message sections allowing data to be changed as shown in FIG. 11.

Figure 2:
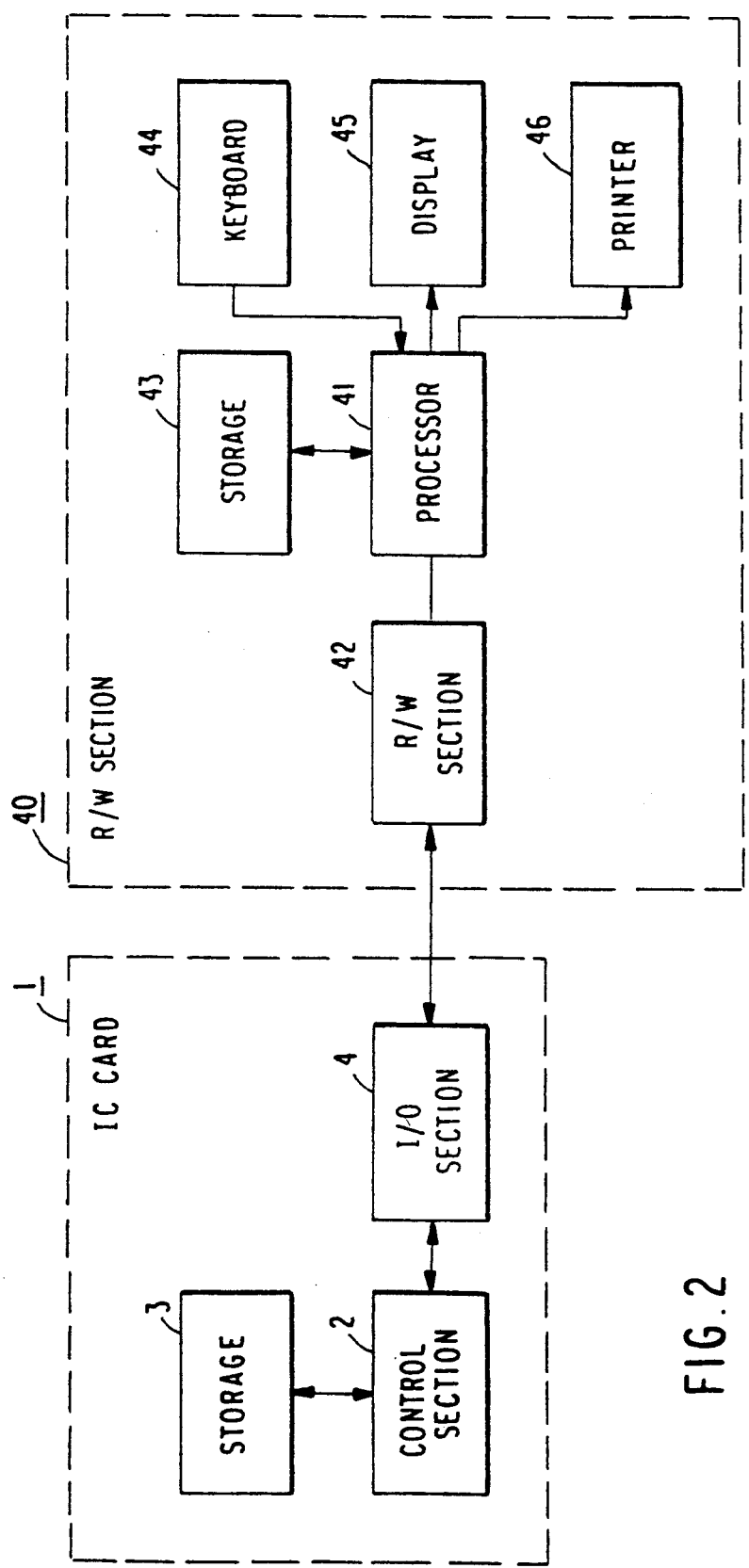
FIG. 2 is a block diagram showing primary parts of a portable storage medium processing system.
Figure 3:
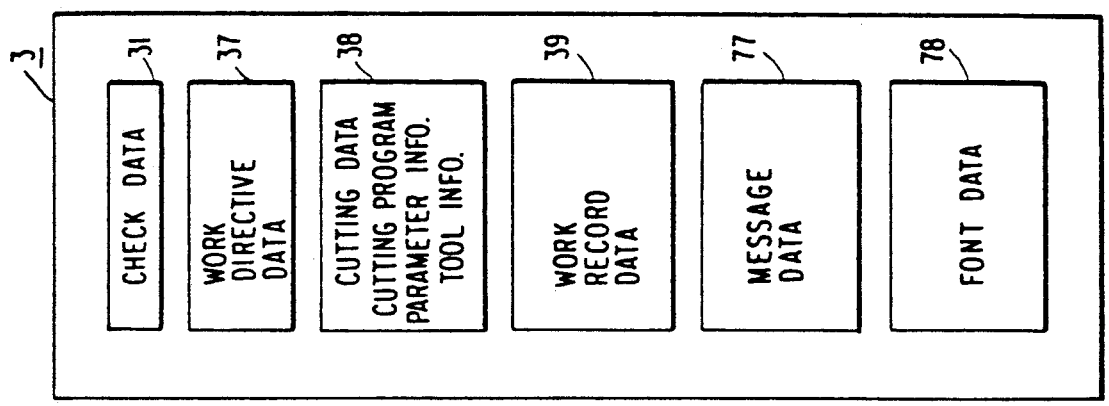
FIG. 3 illustrates the locations of data stored in a memory.

FIG. 2 is a block diagram of the portable storage medium processing system. This embodiment will be described employing an IC card as a portable storage medium. Referring now to FIG. 2, the numeral 1 indicates an IC card, and 40 a processor for performing processing such as data transfer to and from the IC card 1. The IC card 1 includes a storage 3 for storing various types of data (described later), an input/output section 4 forming a signal path to and from the processing system 40 or the CNC 10, and a control section 2 comprising, for example, a CPU for controlling the storage section 3 and I/0 section 4. Particularly, as shown in FIG. 3, the storage section 3 includes a check data area 31 employed to determine whether the NC machine tool loaded with the IC card 1 is enabled for operation or not, a work directive data area 37 used to give a work directive to the operator, a cutting data area 38 for storing various types of data required for cutting, a work record data area 39 for recording the details of machining faults or errors as well as the details of the work done by the operator, a message data area 77 and a font data area 78 respectively storing messages and fonts in a language used by the operator.

Figure 4:
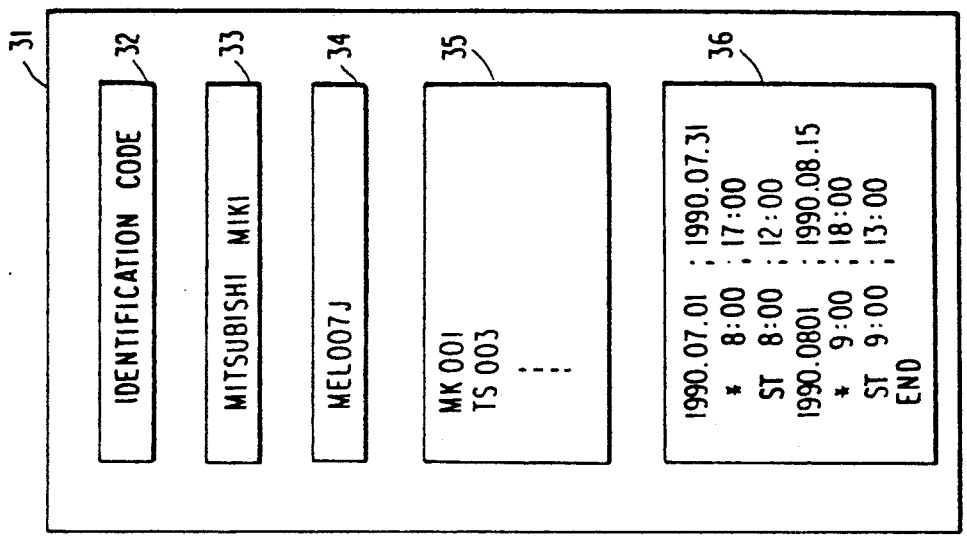
FIG. 4 shows check data locations.

Further, as shown in FIG. 4, the check data area 31 includes an identification code area 32 for storing identification code(s) used to identify whether the IC card 1 is the appropriate one for the present system, an operator name area 33, a PIN code area 34, a machine identification code area 35 for storing the identification codes of machines to be authorized, and a time period and time block area 36 for storing the period and time block in which the operator is permitted to use the CNC.

In FIG. 2, the processor 40 is employed by a system manager to set various types of data to the IC card 1 and fetch data from the IC card 1 for the management of the operator's work. The processor 40 may comprise dedicated hardware, a general-purpose computer, or a personal computer, etc.

As shown in FIG. 2, the main hardware block configuration of the processor 40 is provided with a processor section 41 consisting of, for example, a CPU for controlling the whole operation, a storage 43 for storing various types of information, a display 45 for displaying various types of data for the system manager according to the results of the processing in the processor section 41, a printer 46 for printing various types of information, a reader/writer section (hereinafter referred to as the "R/W section") for forming a signal path to and from the loaded IC card 1 for transferring data, and a keyboard 44 employed by the manager to enter various types of data. The storage 43 contains data required for the IC card 1, e.g. various types of data needed for cutting.

Figure 5:
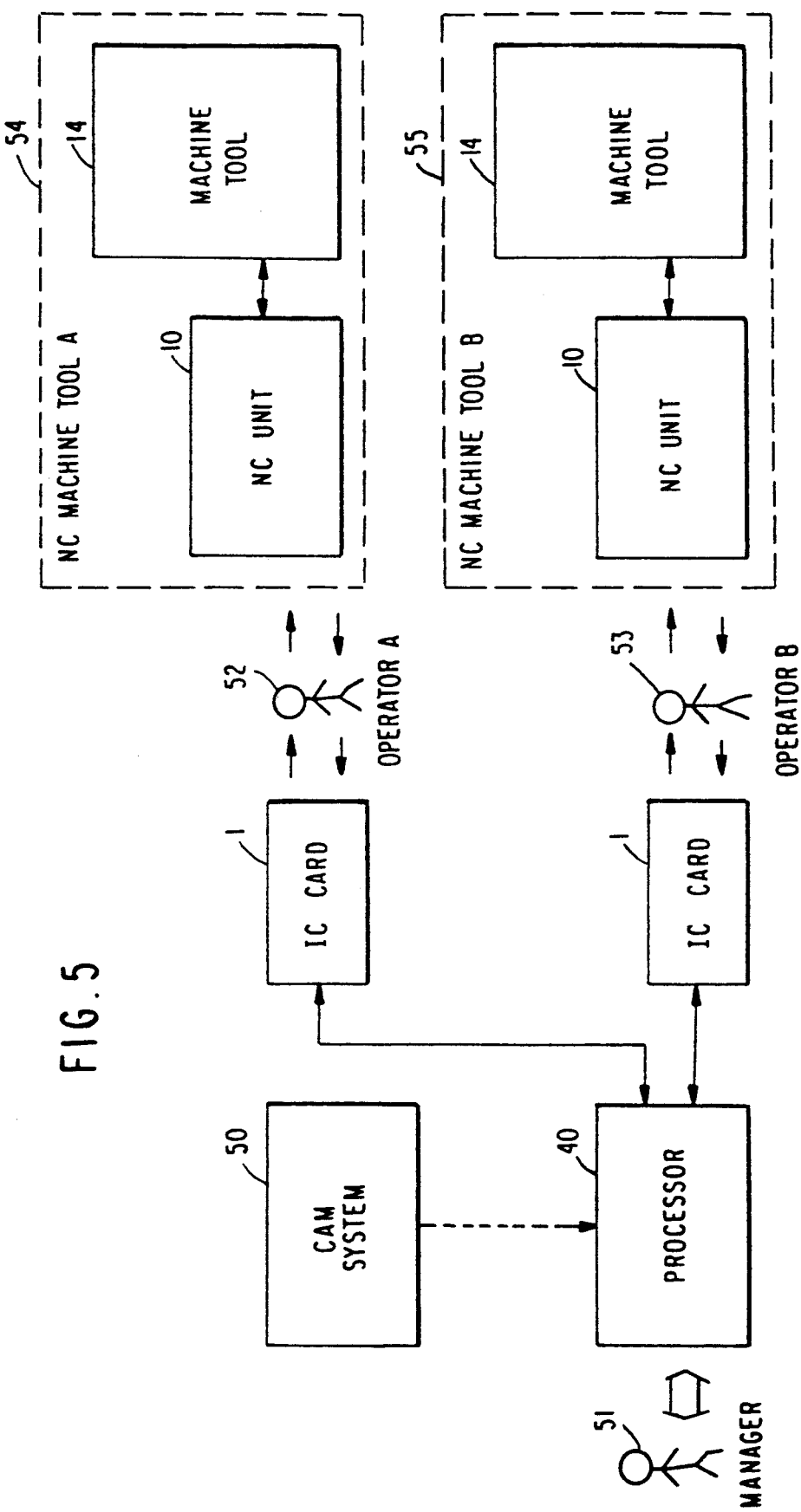
FIG. 5 provides an example of an NC machine tool management form.

The operation of the present invention will now be summarized. FIG. 5 illustrates an example of a management form of an NC machine tool employing a management system of the present invention, wherein a manager 51 instructs an operator 52 and an operator 53 to perform work by operating an NC machine tool 54 and an NC machine tool 55, respectively. Various types of data required (such as cutting programs for machining and parameters and tool information set in the CNC) are assumed to have been created beforehand using a CAM system 50, and stored in the processor 40. It will be recognized that the CAM system 50 and the processor 40 may operate on the same hardware.

The manager 51 devises a work schedule to determine the details of the work to be done by the operators 52, 53.

The IC cards 1, 1 corresponding to the operators 52, 53 are created employing the processor 40 in accordance with the work details. The manager 51 gives the IC cards 1 to the operators 52, 53 and instructs them which NC machine tools to use. This instruction is extremely simple because detailed subsequent work directives are stored in the work directive data area 36 (FIG. 4) of the IC cards 1. The operators 52, 53 load the IC cards 1 into the corresponding NC machine tools 54, 55 and carry out the day's work in accordance with the work directives stored in the IC cards 1. When the day's work is finished, the operators 52, 53 remove the respective IC cards 1, from the NC machine tools 54, 55 and deliver them to the manager 51. The operators 52 53 need not make a detailed report to the manager 51 since the records of their work are kept in the work record data area 34 of the IC cards 1.

By loading the IC cards 1 presented by the operators 52, 53 into the processor 40 and reading the work record data 38, the manager 51 will be able to obtain detailed work records and devise the next work schedule according to the contents of the work records.

Now that the operation example of the management system according to the invention has been summarized, the operation of its necessary areas will now be described in more detail.

The manager 51 stores various types of necessary data into the storage 43 of the processor 40 before initiating cutting. The manager 51 who has devised the work schedule creates the IC cards 1 to be given to the operators 52, 53 by means of the processor 40 in accordance with the work schedule.

Figure 6:
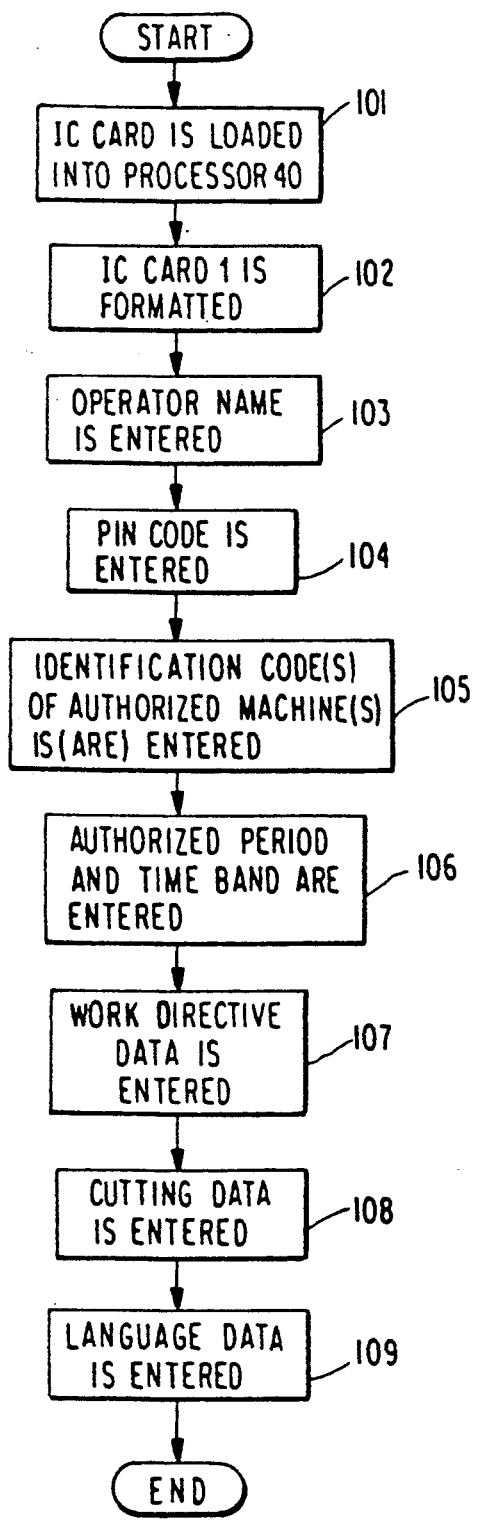
FIG. 6 is an IC card formatting and creating flowchart.

A processing flowchart for creating a new IC card is shown in FIG. 6. The contents of the IC card 1 are first loaded into the R/W section 42 Of the processor 40 (step 101). The IC card 1 is then formatted (step 102). This process clears all areas of the IC card 1 and writes to the IC card 1 an identification code 32 indicating that the IC card 1 is exclusively used for this system. The name of the operator 33 who will receive the IC card 1 is entered (step 103). The PIN code 34 known only to the operator who will receive the IC card 1 is entered (step 104). The identification codes 35 of the NC machine tool(s) which the operator is permitted to use is entered. Respective identification codes 35 are entered when the operator is to use a plurality of NC machine tools (step 105). The period (duration) and time block (e.g., a work shift) when the operator may use the NC machine tool(s) are entered (step 106). Several periods and time blocks may be set and the day of week may also be changed. In the example in the area 36 shown in FIG. 4:

1990. 07. 01; 1990. 07. 31 indicates that the NC machine tool may be used from Jul. 1, 1990 to Jul. 31, 1990, and

* 8:00; 17:00 indicates the NC machine tool may be used in a time block from 8 o'clock to 5 pm on weekdays. It is assumed that the NC machine tool is not allowed for use on Saturdays and Sundays unless otherwise specified as indicated below:

ST 8:00; 12:00 indicates that the NC machine tool may be used from 8 o'clock to 12 o'clock on Saturdays. The other days of the week may be specified individually by Monday (MO), Tuesday (TU), Wednesday (WE), Thursday (TH), Friday (FR) and Sunday (SU). #END designates the end of data.

Returning now to FIG. 6, the work directive data to be processed on that day is then entered (step 107). This data gives the operator specific directives on the work to be done on that day and the details thereof will be described later in the section wherein the operator loads the IC card 1 into the NC unit 10 and is given the work directives. All required cutting data is then entered (step 108). Data on the language used by the operator is entered (step 109).

Among the steps for creating the new IC card 1 as described above, usually only the steps 107 and 108 need be executed if the operator name 33, the PIN code 34, the available NC machine tool 35, the available period and time 36, and the language used 77, 78 are not to be changed. An IC card 1 created as described above is given to each operator who will do the work.

The NC unit 10 according to the present invention is provided with a select switch marked 22 in FIG. 1. This switch makes valid or invalid the instructions of the operator given to the NC unit 10 from the operation board 15 and the MDI 16. When the select switch 22 is OFF, all operator operation is made invalid and the NC unit 10 and the machine tool 14 are disabled. This select switch 22 is switched ON/OFF on a software basis and switched ON when it is judged that predetermined conditions have been met.

Further, the NC unit 10 according to the present invention includes a function of disabling part of the operator's instructions, e.g. a function to disable entered data. This prevents a cutting program or parameters, from being rewritten unless the machine is enabled to accept such instructions. As illustrated in the flowchart in FIG. 27, when an attempt is made to change a parameter, a check is made to see if parameter rewrite is permitted (step 161), and if it is permitted, rewrite processing is performed (step 162). If it is not permitted, error processing is performed (step 163). This processing notifies the operator that parameter rewrite is not permitted, by a screen display, etc. Similarly, when an attempt is made to rewrite a cutting program, a check is made to see if cutting program rewrite is permitted (step 164), and if it is permitted, rewrite processing is performed (step 165). If it is not permitted, error processing is performed (step 163).

Whether the rewrite permission has been granted or not is judged by the PIN code 34 (FIG. 4) known to the operator. "J" at the end of the PIN code indicates that rewrite permission has not been given and "S" indicates that rewrite permission has been granted.

The operator must load the predetermined dedicated IC card 1 into the NC unit 10 before initiating operation. The NC unit 10 according to the present invention is not designed to provide for the removal of the IC card 1 by the operator partway through the operation. Namely, the NC unit 10 always checks if the IC card 1 is properly inserted in the NC unit 10, and if it detects the absence of the IC card 1, the NC unit 10 comes to an emergency stop, brings the machine tool 14 to a stop, and switches off the select switch 22, thereby disabling the NC unit 10 and the machine tool 14 from operation unless the IC card 1 is properly loaded into the NC unit 10 again.

Figure 7:
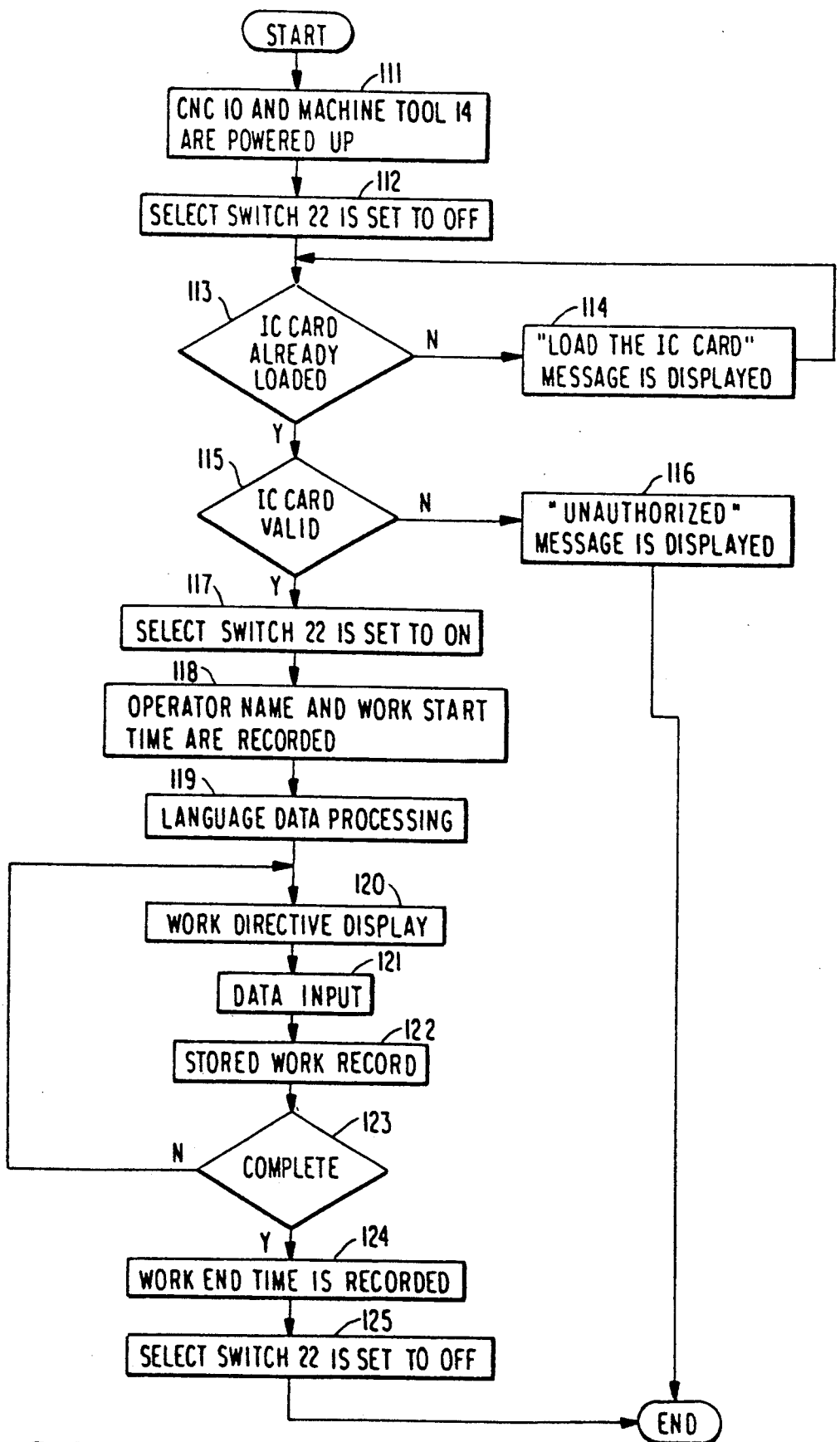
FIG. 7 is an NC processing flowchart.

The procedure for starting machine operation will now be described. Each operator loads the IC card 1 into the R/W section 20 of the corresponding NC machine tool 14 and initiates work. An NC unit processing flowchart beginning with the start of the work by the operator is shown in FIG. 7. The CNC unit 10 and the machine tool 14 are powered up (step 111). The select switch 22 is set to OFF to disable the operation board 15 and the MDI 16 for operation (step 112). This completely disables the NC machine tool 14 for operation until the select switch 22 is set to ON. A check is made to see if the IC card 1 is coupled to or loaded in the R/W section 20 of the CNC 10 (step 113). If the IC card 1 is not loaded, the following message is displayed on the display unit 17 of the CNC:

"LOAD THE IC CARD."

in order to prompt the operator to insert the IC card 1 (step 114). If the IC card 1 is loaded, a check is made to see whether or not the IC card 1 inserted may be used (step 115).

Figure 8:
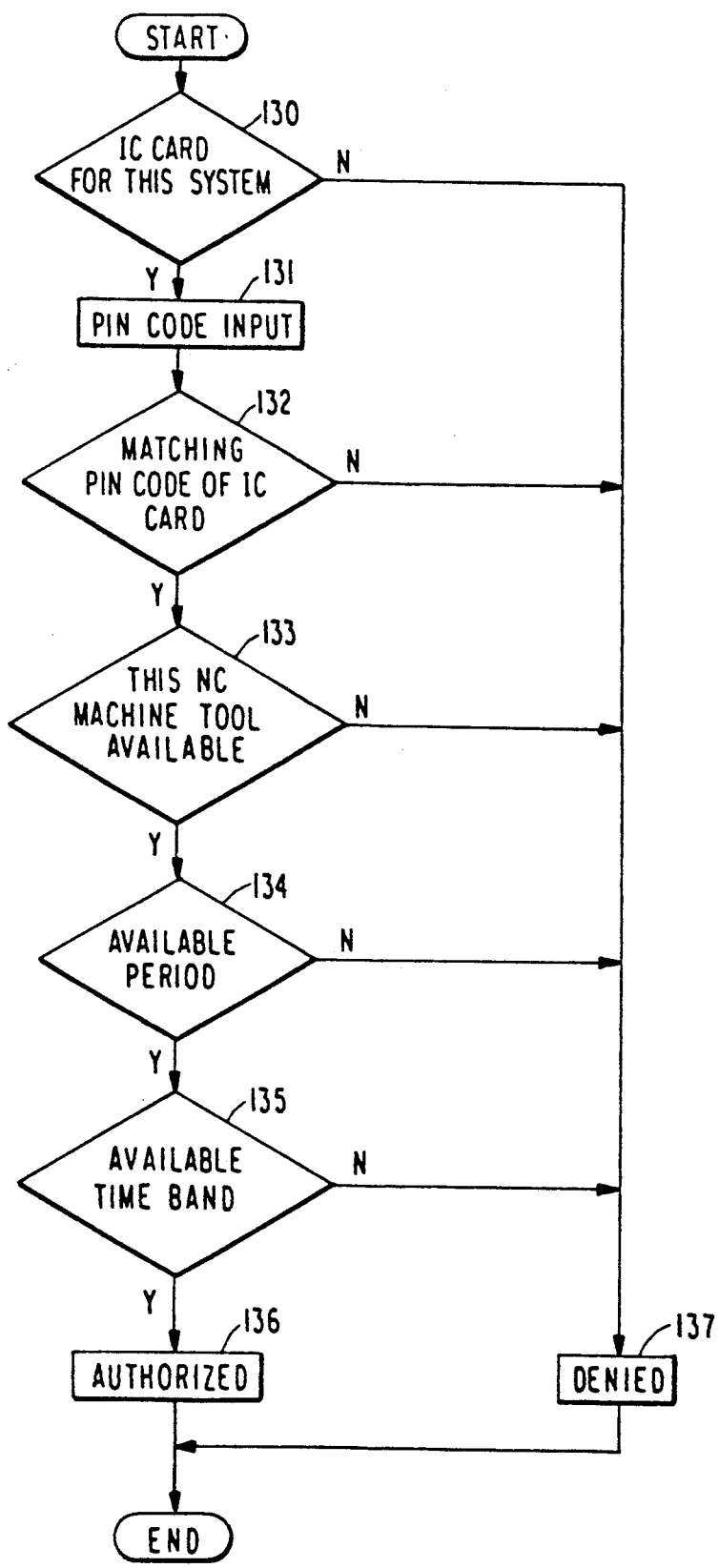
FIG. 8 is an IC card checking flowchart.

This check is performed as shown in FIG. 8. First a check is made on the identification code 32 among the data stored in the check data area 31 of the IC card 1 to see if the IC card 1 is for this system (step 130). If it is, the operator is prompted to enter the PIN code (step 131). The select switch 22 is set to ON in this case to enable the PIN code to be entered from the MDI 16. When the operator enters the PIN code, the select switch 22 is set to OFF again and a check is made to see if the PIN code entered matches the PIN code 34 in the IC card 1 (step 132). If the PIN codes match, a check is made to see if the machine identification code stored in the CNC exists in the machine identification code area 35 stored in the IC card 1 (step 133). If the IC card 1 is judged as valid, then the available period and time block 36 in the IC card 1 are checked to see if permission to use the NC machine tool 14 is granted at this point on the basis of the calendar and the clock in the CNC (step 135). If in the available time windows, permission is granted (step 136). Permission is not granted if any of the conditions at steps 130, 132, 133, 134 and 135 is not satisfied (step 137). Whether or not permission is granted to the operator is judged via the above procedure.

Returning to FIG. 7, if the permission is not obtained, the following message or the like is displayed on the display unit 17 of the CNC (step 116):

"UNAUTHORIZED"

to disable any operation. If permission is provided, then the select switch 22 is set to ON to enable the operation board 15 and the MDI 16 for operation, thereby allowing the operator to operate the NC machine tool 14 (step 117). The CNC reads the operator name 33 recorded in the IC card 1 and records the operator name 33 and the work starting date and time of day into the operation recording memory of the NC unit 10 as shown in FIG. 28 on the basis of the calendar and clock data in the CNC (step 118).

Processing on the language data is then performed (step 119). This process replaces the language data in the NC unit 10 with the language data stored in the IC card 1, thereby changing the language displayed by the NC unit 10 if appropriate.

The display control section concerned with the present invention will now be described. FIG. 11 is a block diagram illustrating the display control section of the NC unit 10 concerned with the embodiment of the present invention, wherein the numeral 1 indicates an IC card which, as shown in FIG. 3, includes a storage section 3 for storing various types of data including message data corresponding to the specified language in the area 77 and font data corresponding to the same language in the area 78. The message and font data are language data, e.g. data for English, French, Korean and German.

As shown in FIG. 11, a font RAM 73 is used as a memory for storing the font data to allow the font data in the NC 10 to be changed. As shown in FIG. 19, the font RAM 73 is divided into a common font section 75

(a font section used commonly for each language, and containing such common elements as numerals, symbols, etc.) and a language-basis font section 76. Since the common font section 75 need not be changed according to the language used, only the language-basis font section 76 is changed. This language-basis font section is also stored in the font data section 78 of the IC card 1. If desired, the IC card may be made to store the common section data as well, as a guard against memory loss due to battery failure or the like in the NC itself.

Further, a RAM area 74 for storing message data on a language basis is provided as shown in FIG. 11 to display messages corresponding to the language used. Messages to be shown on the NC display are not described directly in the control program in the NC 10 but message numbers are described in the control program so that the required message is displayed by extracting the message data corresponding to the specified number from the message RAM 74.

In language processing, a check is first made to see if the language data in the IC card 1, i.e. the message data 77 and the font data 78, exist as shown in the processing flowchart of FIG. 21 (step 141). If that data does not exist, language data processing is not performed.

If the data exists, a check is made to see if the font data 78 in the IC card 1 differs from the font data 74 stored in the NC (step 142). If they are identical, font data processing is not performed. If they are different, font data 78 is entered from the IC card 1 to the font RAM 73 in the NC unit 10 (step 143).

A check is made to see if the message data 77 in the IC card 1 differs from the message data 74 stored in the NC 10 (step 144). If they are identical, message data processing is not performed. If they are different, the message data 77 is entered from the IC card 1 to the message RAM 74 in the NC unit 10 (step 145).

To identify whether the font data 73 is different or not, a language identification code 84 in the font data section 78 as shown in FIG. 20 is compared with the language identification codes in the font data section of the CNC. The message data is also identified in an identical manner.

As described above, the contents of the font RAM 73 can be changed as appropriate by storing the font data placed in the font data area 78 of the IC card 1 into the font RAM 73 of the NC unit 10.

The contents of the message RAM 74 can be changed as appropriate by storing the message data placed in the message data area 77 of the IC card 1 into the message RAM 74 of the NC unit 10.

Returning to FIG. 7 again, the process of giving work directives to the operator on the basis of the work directive data 37 in the IC card 1 will now be described. After reading the work directive data 37 in the IC card 1, the NC unit 10 proceeds with the work by displaying a work directive for the operator according to the data described in the work directive data area 37 (step 120), entering the cutting program, parameters, tool information, etc. as required (step 121), storing the work record into the work record data area 39 of the IC card 1 (step 122), and performing the batch processing for the next work directive. When all work is complete (step 123), the NC unit 10 records the work end time of day in the CNC (step 124) and terminates the work. At this time, the select switch 22 is set to OFF to disable the NC machine tool for further operations (step 125).

The above work directive data is processed as batch data in a batch processor 8 as shown in FIG. 24. While the NC unit known in the art only analyzes and runs the cutting program in a cutting program processor 9, the NC unit 10 according to the present invention is provided with the batch processor 8 on a higher level than the cutting program processor 9 to allow the batch data such as the work directive data 32 to be processed, the NC unit 10 to transfer various types of data, such as the cutting program, parameter and tool data, and run the specified cutting program the specified number of times, and to allow the data to be displayed on the display unit 17 of the NC unit 10 to give the operator the work directives. It is also possible to switch from batch processing to ordinary processing to operate the NC unit 10 without performing batch processing, unlike in the ordinary NC unit.

The operator's operations during batch processing will now be described. FIG. 14 gives an example of a display provided on the CRT screen 72 of the display unit 17 on the NC unit 10 while batch processing is performed. As shown on this screen, it is possible to display a work directive for the operator on the CRT screen 72 on the basis of the work directive data 37.

Menu items "PRECEDING SCREEN" and "FOLLOWING SCREEN" are employed to view the preceding screen and the following screen, respectively, when a long work directive must be displayed over a plurality of screens.

By pressing a menu key 25 corresponding to a menu item "WORK DIRECTIVE" among menu items 27, the most recent work directive data is displayed on the screen 72. This is because display data 26 to be shown on the CRT screen 72 of the display unit 17 on the NC unit 10 are created by synthesizing screen data 29 created by ordinary processing, i.e. screen data to be displayed when batch processing is not performed, and screen data 30 created by the batch processing as shown in FIG. 26. The data 29, 30 is stored until updated, and therefore, any area cleared by the data 30 displayed by batch processing can be restored any time, and conversely, the data 30 created by the batch processing can be displayed again. If the ordinary screen data 29 is overwritten by the data 30 created by the batch processing on the screen display, the menu item "WORK DIRECTIVE" is highlighted. If the data 30 created by the batch processing is erased, the "WORK DIRECTIVE" item is not highlighted. By selecting this "WORK DIRECTIVE" menu item, the work directive display can be erased or redisplayed. When the work directive extends over a plurality of screens, all data is created in the area 30 and part of that data is displayed on the screen. Therefore, the required area of the work directive can be displayed on the CRT screen 72 by pressing the menu item "PRECEDING SCREEN" or "FOLLOWING SCREEN". A menu item "PRINT" is employed to print the work directive, i.e., the data displayed by batch processing, on a printer.

By pressing a menu key 25 corresponding to a menu item "FREE OPERATION", the batch processing is stopped and the ordinary NC unit operation is enabled. In this case, the "FREE OPERATION" menu item changes to "BATCH OPERATION" and the selection of "BATCH OPERATION" allows the batch operation to be resumed (i.e., the menu key acts as a toggle). However, since interruption occurs partway during the batch operation, it is necessary to resume the batch operation after returning to a state wherein the batch operation may be resumed (e.g. machine state). This allows the operator to interrupt the batch processing as appropriate and perform arbitrary processing. Since the NC unit 10 according to the present invention also allows the processing to be either performed via the batch processor 8 or in the same manner as in the ordinary NC unit without batch processing as shown in FIG. 24, the NC unit 10 can be used while switching between batch processing and ordinary processing as necessary.

A menu item "CHECK" is used to notify the NC unit 10 that the operator has finished the required work in response to the work directive.

The work directive data will now be described. FIG. 13 provides an example of the work directive data, which is stored in the work directive data area 37 of the IC card 1. The NC reads and executes this data sequentially. It should be noted that while the work directive data 37 is executed after it is read in the system of the present invention, it is possible to sequentially execute the work directive data 37 while simultaneously reading it from the IC card 1.

Figure 17:
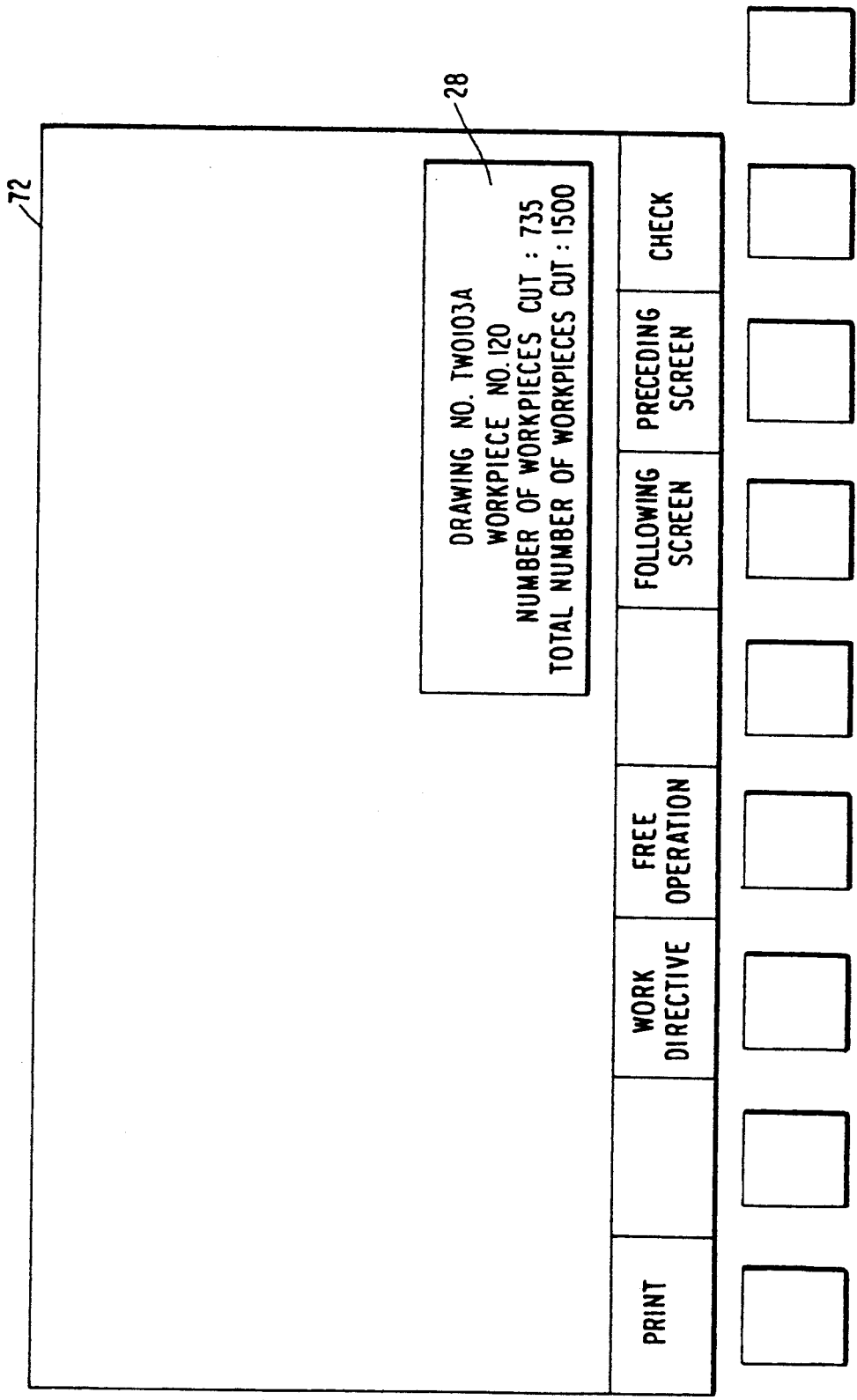
FIG. 17 shows another example of a work directive screen display.

In FIG. 13:

*DISP ALL indicates that the entire area of the CRT screen 72 of the display unit 17 on the NC unit 10 is used. This causes the whole area of the CRT screen 72 to be employed for display. When it is desired to use only part of the CRT screen 72, e.g. it is desired to overwrite the ordinary NC unit display screen and use only part thereof, the operator can specify the area desired for use as indicated below:

*DISP @16, 50-20, 80 which indicates that only the area from line 16, column 50 to line 20, column 80 on the screen is used for display and the previously displayed data remains in the other area. By specifying the employed area as indicated above, specified data is displayed only in the specified part of the screen marked 28 in FIG. 17 and the previous display remains in the other part.

*CLEAR indicates that the specified screen area (the entire screen for *DISP ALL and only the specified portion for other display situations, i.e., *DISP @16, 50-20, 80) is cleared.

*@6, 23 SAY "* TOOL LAYOUT *"

indicates that the data enclosed in the quotation marks (" ") is displayed in the specified position, i.e.:

* TOOL LAYOUT * is displayed, beginning in line 6, column 23, in the above example.

*CHECK progresses the execution to the next step when the operator presses the menu key 25 corresponding to the "CHECK" menu item 27 displayed on the display unit 17 in FIG. 14.

*LOAD W120 indicates that the cutting program for workpiece No. 120 in the IC card 1 is stored into the memory 18 of the NC unit 10.

*LOAD P001, 90.08.03 indicates that parameters in the IC card 1 are stored into the memory 18 of the NC unit 10. "P001" shown above is a parameter name and "90.8.03" denotes the date of creation.

The NC unit 10 according to the present invention manages all data, such as the parameters and tool data, under names 81 and dates 82 assigned thereto as indicated in FIG. 22; wherein the numeral 80 indicates a parameter data section contained in the memory 18 of the NC unit 10 and parameter names 81 and dates of creation 82 are stored therein together with parameter data 83. The date may include year, month, day and time of day.

FIG. 23 illustrates a processing flowchart for storing the data of the IC card 1 into the memory 18 of the NC unit 10. First a check is made to see if a parameter specified in the work data 37 also exists in the cutting data area 38 of the IC card 1 (step 151). In this case, a check is made to determine whether both the parameter name and date are identical. If the specified parameter does not exist in the IC card 1, a check is made to see if the specified parameter is identical to a parameter stored in the NC (step 152). If it does and they are identical, the processing is terminated. If they are different, error processing is performed (step 153) and the processing is then terminated. In error processing, a message is displayed to notify the operator that the parameter does not exist and asks the operator what to do. If the specified parameter exists in the IC card 1 at step 151, a check is made to see if the specified parameter is identical to one stored in the NC (step 154). If they are different, the parameter stored in the cutting data area 38 of the IC card 1 is read to the memory 18 of the NC unit 10 (step 155). If they are identical, processing is terminated since the parameter need not be read. Whether they are identical or not is judged by the parameter names 81 and parameter dates 82.

When the corresponding data is rewritten by the operator, the dates 82 are also changed to the dates when the data has been rewritten. This allows any data, whether or not it has been changed by the operator, to be easily identified.

Returning now to FIG. 13:

*LOAD T001, 90.08.11 indicates that the tool data is stored into the memory 18 of the NC unit 10. As in the case of parameters, "T001" is a tool data name and "09.08.11" represents a date of creation. The procedure for storing the tool data into the NC unit 10 is also similar to that used in the case of parameters.

*DO W120, 1500 indicates a command which repeats the cutting of workpiece No. 120 1500 times. This causes the NC unit 10 to be started and the cutting program of the workpiece No. 120 to be consecutively run 1500 times.

Figure 15:
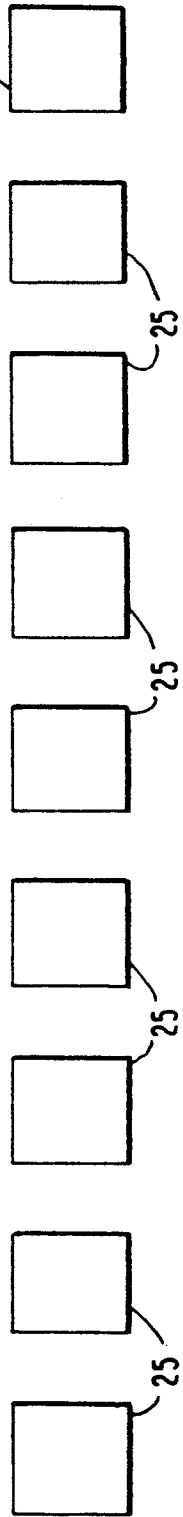
FIG. 15 shows another example of a work directive screen display.

FIG. 14 illustrates a work directive displayed on the CRT screen 72 of the display unit 17 on the NC unit 10 at a time when the work data in FIG. 13 is executed. This directive instructs the operator to set the tool data as directed. When the operator presses the menu key 25 corresponding to the menu item "CHECK" 27 after setting and checking the tool data, the next work directive as shown in FIG. 15 is displayed. In this way, appropriate work directives can be given to the operator sequentially on the basis of the work directive data 37.

Figure 16:
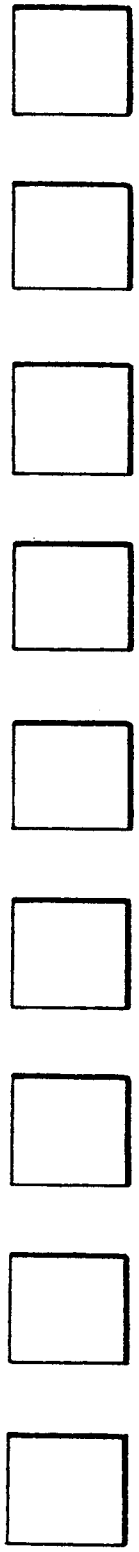
FIG. 16 provides a further example of a work directive screen display.

As soon as the cutting of 1500 pieces of workpiece No. 120 is finished, the next directive as shown in FIG. 16 is displayed whereby the operator can progress the work according to the appropriate work directives from the NC unit 10. As the work directives are given only at the beginning and end of cutting in the above example, the creation of work directive data as shown in FIG. 25 allows the "NUMBER OF WORKPIECES CUT" incremented by 1 every time one workpiece is cut to be displayed on part of the screen marked 28 in FIG. 17. FIG. 25 illustrates a batch program showing how this would be done:

*WC=0
indicates 0 is assigned to a variable named WC".
*DOWHILE WC<1500
indicates the execution is repeated up to *ENDDO if the value of "WC" is less than 1500.
*WC=WC+1
indicates that the value of "WC" is incremented by 1.
@18, 66 DISPN(WC, 4, 0)
indicates that the value of "WC" is displayed in four digits and zero decimal places, beginning in line 18, column 60.

"WC" is a numerical value representing the number of workpieces cut.

In the above example, the batch processing data is treated as the work directive data 37 separately from the cutting program and executed by the batch processor 8. However, since any batch data is headed by "*" or "@" which clearly differentiates batch data from ordinary NC cutting program commands, i.e. a cutting program conforming to the EIA programming standard, the batch data may be described within the ordinary cutting program and executed separately from the cutting program. This allows directives to be given and messages to be displayed for the operator more appropriately when they are required partway through the cutting.

FIG. 18 shows an example of data recorded in the work record data area 39 of the IC card 1, wherein the work start time of day and the end time of day are recorded. In this example, the work was started at 8:11 in the morning on Aug. 7, 1990 and ended at 4:41 in the afternoon on the same day. During the work, the "time of day" when a "CODE" and its event occur and the "details" of the event are recorded. In this example, the following information is recorded:

1) The input of workpiece No. 120 data was started at 8:15;
2) The input of parameter "P001" was started at 8:17;
3) The input of tool data "T001" was started at 8:20;
4) The beginning of cutting of workpiece No. 120 500 times was started at 8:31;
5) The cutting of 500 copies of workpiece No. 120 ended at 11:54;
6) Work was halted at 12:03;
7) Work was restarted at 1:17;
8) The input of data on workpiece No. 700 was started at 1:26;
9) The cutting of the first of 200 copies of workpiece No. 700 was started at 1:47;
10) Tool No. 11 was broken at 2:13 (at this point, 47 copies of workpiece No. 700 were finished);
11) Tool data "T001" was changed at 2:34;
12) Cutting was resumed at 2:47; and
13) The cutting of 200 copies of workpiece No. 700 ended at 4:07.

The manager 51 can display this data on the display 45 of the processor 40 or print it on the printer 46.

Figures 9, 10:
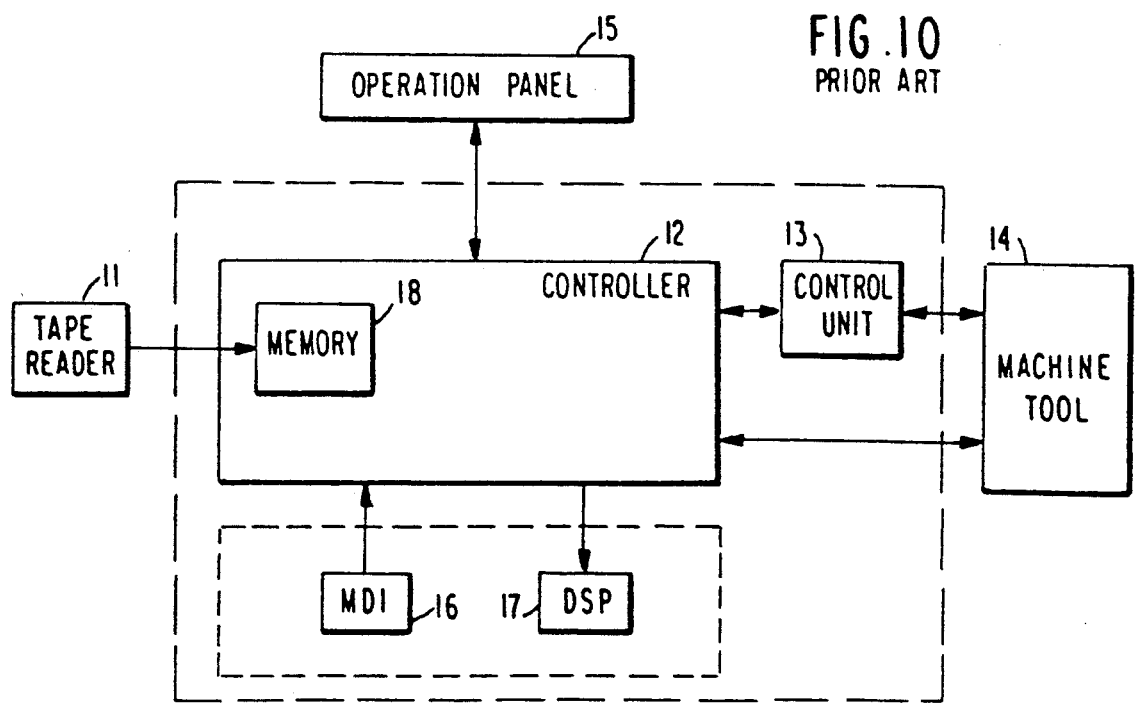
FIG. 9 gives an example of operation record data.
FIG. 10 is a block diagram illustrating main parts of an NC unit known in the art.

FIG. 9 shows a work operation record stored in the operation recording memory 23 in the CNC. In this example, an operator named "MITSUBISHI MIKI" operated continuously from 8:11 to 4:41 on Aug. 7, 1990, and then an operator named "MITSUBISHI YOUKO" began work at 8:15 on Aug. 8, 1990. A detailed work record similar to the data recorded in the work record data area 39 of the IC card 1 is also recorded here at the same time.

The present invention allows only authorized operators to operate the CNC, ensuring that the CNC cannot be employed without permission. In addition, closer management can be performed because operators may be authorized to use the CNC corresponding to only one or a plurality of machines. Unlike the data rewrite disable key employed with the prior art CNC, the present invention allows any operator use to be invalidated, thereby preventing illegal use.

The present invention can selectively disable operation for items resulting in inconvenience if rewritten erroneously, e.g. parameters and cutting programs, eliminating the possibility of illegal data changes. Closer management can be conducted since permission is granted on an operator basis.

Unless the portable storage medium is loaded, the present invention disables the operation of the CNC to prevent the CNC from being operated illegally. Further, if the operator removes storage medium on leaving the field site, it is possible to completely prevent the CNC from being operated by any unauthorized person.

The present invention allows the CNC to be operated only during a period and time band permitted to the operator.

The present invention allows the language shown on the display of the NC to be changed as desired according to the operator, whereby the NC can be operated by any operator independently of the language he or she speaks and utilized in any country, contributing to the achievement of effective utilization of the NC on an international basis.

In addition, the present invention ensures ease of changing the language, producing an advantageous effect on the utilization environment of the NC wherein different languages are employed alternately. Further, data necessary for the change in language is placed in a single IC card which is freely portable and the operator can carry his or her own IC card and easily switch to a language he or she prefers at the start of work, leading to an improvement in working environment of the operator. Moreover, since the font in the NC can be changed, symbols and the like can be used as required to give a message to the operator. Further the present invention prevents the contents of the font RAM or the message RAM from being rewritten accidentally; the external storage medium contains the desired font data or message data.

The CNC describes all necessary instructions automatically in the work directive data and executes the data in batch processing. This ensures that data entry errors, misoperation, etc. can be prevented. In addition, when manual work by the operator is unnecessary, all work can be done by batch processing only, which eliminates the need of manpower other than an operator deployed in the case of an emergency, making a large contribution toward unattended operation of the CNC.

The present invention can give appropriate work directives to the operator by sequentially displaying them on the CNC screen.

The present invention allows switching between the work directive display and the ordinary CNC display so that the last work directive displayed may be checked. The operator can output the work directive displayed on the screen to the printer as required, which is useful when work must be done at a location where it is difficult for the operator to do the work and view the screen at the same time.

When it is desired to stop the work, batch processing can be stopped and resumed at any time, which is useful when the operator wishes to stop a machine tool and take a rest or when it is desired to halt cutting for such purposes as chip removal.

Data such as parameters and tool information need not be checked in detail and can be differentiated using assigned names so that whether or not the data is correct can be judged by simply checking the names before cutting. As compared to a case where names cannot be assigned in the prior art, easier management is ensured by assigning names to the data corresponding to cutting.

If data has been rewritten with the name remaining unchanged, the date of creation can be assigned for ease of checking if the data has been rewritten. Comparison of the names and dates of creation allows any data to be checked securely, increasing the reliability of the work.

Data can be displayed on the CNC screen during the run of a cutting program and the control of the cutting program run itself can be described in a dedicated language, making the cutting program control considerably flexible.

The work record of each operator can be kept exactly to ensure precise work management.

The operation record of the CNC can be kept exactly to ensure proper CNC management. This allows any accident resulting from misoperation, etc. to be troubleshooted easily.

I claim:

1. A numerical control system for controlling a machine tool, comprising:
   control means for controlling the machine tool;
   external portable storage means for storing data;
   means for disabling said control means;
   read/write means, operable when an external portable storage means is manually coupled thereto, for reading data from said external portable storage means and for writing data to the external portable storage means; and
   determining means for determining whether the external portable storage means is coupled to said read/write means;
   said disabling means disabling said control means when said determining means determines that the external portable storage means is not coupled to said read/write means.

2. The numerical control system as defined in claim 1, further comprising processing means for controlling said read/write means.

3. The numerical control system as defined in claim 1, further comprising input means for inputting first operator identification data, wherein said external portable storage means stores second operator identification data, said read/write means reads the stored second operator identification data from the external portable storage means, and said disabling means disables said control means if the first identification data inputted by said input means does not match the second identification data read from the external portable storage means by said read/write means.

4. The numerical control system as defined in claim 1, further comprising internal storage means for storing first machine identification data, wherein said external portable storage means stores second machine identification data, said read/write means reads the second machine identification data, and said disabling means disables said control means if said first and second machine identification data do not match.

5. The numerical control system as defined in claim 1, further comprising clock/calendar means for generating time data representing a present day and time, and wherein said external portable storage means stores time period data representing a period of time an operator may work, said read/write means reads said stored time period data, and wherein said disable means disables said control means if the generated time data is not within the time period represented by the read time period data.

6. The numerical control system as defined in claim 1, further comprising display means operable for displaying, in response to said determining means determining that said external portable storage means is not coupled to said read/write means, a message prompting an operator to manually couple the external portable storage means to said read/write means.

7. The numerical control system as defined in claim 1, wherein said external portable storage means comprises storage means, input/out means, and control means controlling said storage and input/out means.

8. The numerical control system as defined in claim 1, further comprising a display means, and wherein said external portable storage means stores work directive data representing work directives for an operator, said read/write means reads said stored work directive data, and said display means displays said read work directive data.

9. The numerical control system as defined in claim 8, wherein said external portable storage means further stores language data representing a predetermined language, said read/write means reads said stored language identification data and wherein said display means displays said work directive data in a language according to said read language data.

10. The numerical control system as defined in claim 1, wherein said disabling means comprises a switch.

11. The numerical control system as defined in claim 1, further comprising means for generating recording data representing at least operations performed by said control means, and wherein said read/write means writes the recording data to said external portable storage means, and said external portable storage means stores the written recording data.

12. The numerical control system as defined in claim 11, further comprising an external processor unit, said external processor unit comprising a storage means, read/write means for reading data from and for writing data to said external portable storage means, and output means.

13. The numerical control system as defined in claim 12, wherein said recording data stored in said external portable storage means is read by said read/write means of said external processor, and stored in said storage means of said external processor.

14. The numerical control system as defined in claim 13, wherein said output means of said external processor outputs the stored recording data from said storage means of said external processor.

15. The numerical control system as defined in claim 14, wherein said output means of said external processor is at least one of a display and a printer.

16. The numerical control system as defined in claim 15, wherein the recording data includes data representing a time said control means performs an operation.

17. The numerical control system as defined in claim 8, further comprising reading means for reading a control program, a batch processor and a program processor, said program processor processing the control program read by said reading means, and said batch processor processing data read from the external portable storage means by said read/write means as batch data.

18. The numerical control system as defined in claim 17, further comprising batch processor disabling means for disabling said batch processor, said batch processor disabling means being manually operated.

19. The numerical control system as defined in claim 1, further comprising an external processor, said external processor having read/write means for reading data from said external portable storage means and for writing data to said external portable storage means, and input means for inputting data to said external portable storage means via said read/write means.

20. The numerical control system as defined in claim 19, wherein said external processor further comprises storage means for storing data to be written to said external portable storage means.

21. A control system for controlling a machine tool, comprising:

control means for controlling the machine tool;

external portable storage means for storing data;

read/write means, operable when said external portable storage means is manually coupled thereto, for reading data from said external portable storage means and for writing data to the external portable storage means; and means for generating recording data to be recorded in said external portable storage means, including operations performed by said machining tool and a work record of work performed by an operator of said machine tool.

* * * * *